Oct. 16, 1945.
J. SHIELD
2,386,753
INSULATED ELECTRICAL CONDUCTOR AND CABLE
Filed Oct. 3, 1942
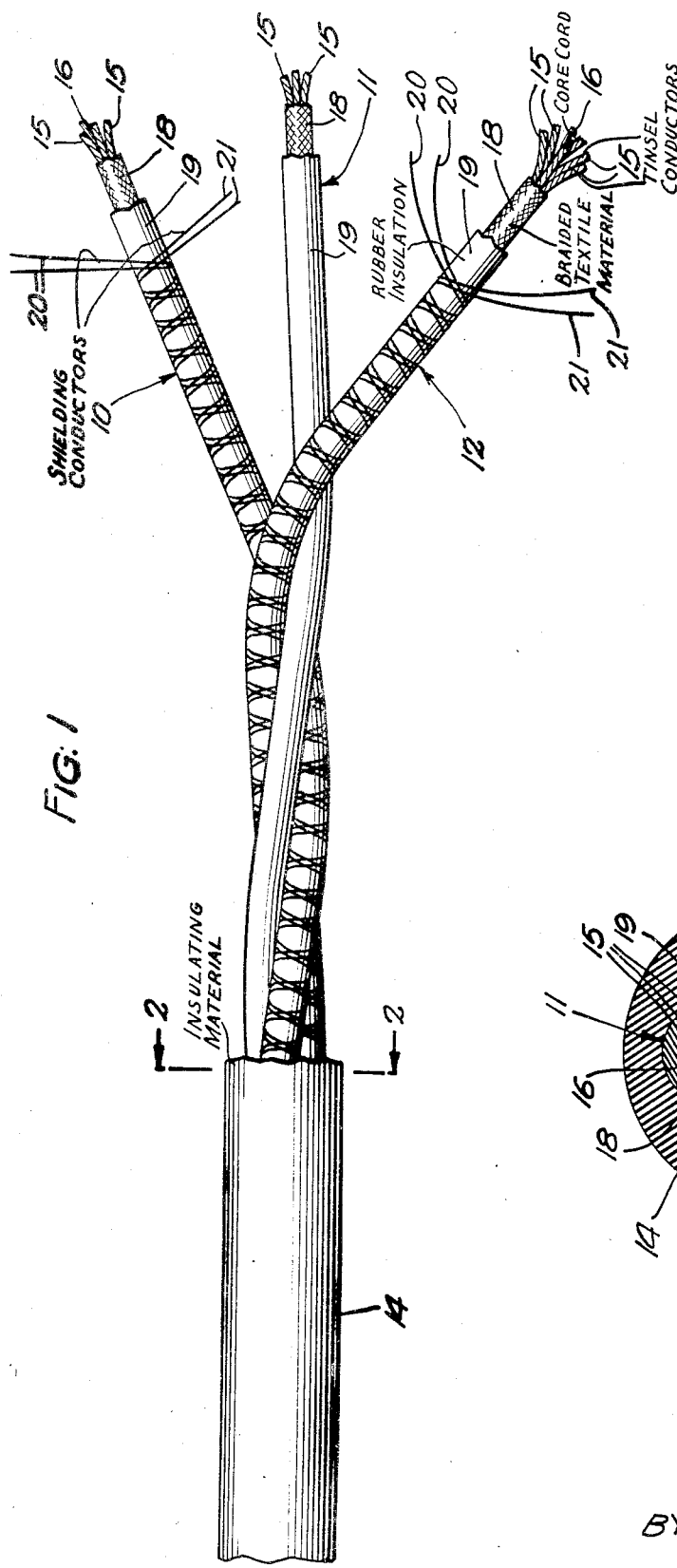
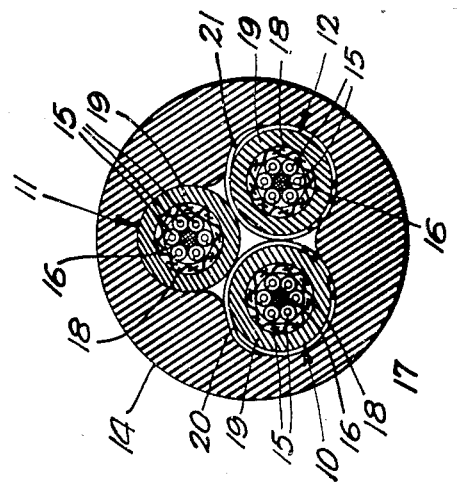
INVENTOR
J. SHIELD
BY
ATTORNEY Patented Oct. 16, 1945

2,386,753

UNITED STATES PATENT OFFICE 2,386,753

INSULATED ELECTRICAL CONDUCTOR AND CABLE

John Shield, Valois, Quebec, Canada, assignor to Western Electric Company, Incorporated, New York, N. Y., a corporation of New York Application October 3, 1942, Serial No. 460,618

3 Claims. (Cl. 174—36)

This invention relates to insulated electrical conductors and cables, and to methods of making them.

It has been the general practice for some time to shield insulated conductors, which were to be used for transmitting audio frequency currents, from extraneous electric currents or disturbances in order to avoid interference. In the past, one method of shielding such conductors has been to apply a braid of metallic wire over the insulation surrounding the conductor. This metallic braid was expensive and its application to the conductor was necessarily slow. Whenever a number of conductors in a cable required shielding, the additional layer of metallic braid over each of the conductors to be shielded naturally increased the over-all size of the cable. Furthermore, the shielding effect of the metallic braid was uniform and could not be conveniently varied, as is desirable in certain instances.

Objects of this invention are to produce new and useful insulated electrical conductors and cables, and to provide new and improved methods for producing them.

An insulated electrical conductor which illustrates one embodiment of the present invention comprises a central conductor, a layer of insulating material surrounding the central conductor, and a pair of conductors wound helically over the layer of insulating material in opposite directions.

Other features and advantages of the invention will become apparent from the following detailed description thereof, when read in conjunction with the accompanying drawing, in which Fig. 1 is a view in elevation of an electric cable having portions thereof broken away, and Fig. 2 is a cross sectional view of the cable taken on line 2—2 of Fig. 1.

In the particular embodiment of the invention disclosed in the accompanying drawing, a plurality of insulated multi-stranded tinsel conductors 10, 11 and 12 are twisted about one another as shown in Fig. 1 and covered with a sheath 14 of insulating material, such as rubber or rubber composition, to produce an electric cable. In constructing the conductors 10, 11 and 12, a plurality of tinsel strands 15—15 are wound around with a textile thread and combined with a core cord 16 within a covering 18 of a braided textile material. Over this covering 18 is applied a layer 19 of rubber insulation.

In the particular cable shown, it is desirable to shield only two of the three conductors, namely the conductors 10 and 12. A method of shielding which illustrates applicant's invention comprises winding two servings of conductors 20—20 in a clockwise direction around each of the conductors 10 and 12 which are to be shielded. The conductors 20—20 are laid parallel to one another and in an open lay helix about each insulated conductor 10 and 12, with the lay and number of servings being adjusted to suit the particular purpose for which the insulated conductor is to be used. The exact gauge of wire used for the conductors is not material, but in the disclosed embodiment of the invention, about 32 gauge wire is employed. Next, two servings of conductors 21—21 are wound in a counter-clockwise direction about the insulated conductors 10 and 12 and in a manner identical to that in which the conductors 20—20 are wound.

After the shielding conductors 20—20 and 21—21 have been applied to the conductors 10 and 12, all of the insulated conductors 10, 11 and 12 are twisted about one another and covered with a sheath of insulating material 14.

An electric cable constructed as disclosed in the above detailed description of the particular embodiment of the invention as shown in the accompanying drawing has been found to operate very satisfactorily. The method of shielding herein described is economical in that it reduces the amount of wire in the shield to but a very small fraction of that required to provide a braided shield and may be applied by standard insulating machines. The rate at which this helically wound open lay shield may be applied is about fifteen times as great as the rate at which the braided wire shield was applied.

When direct current is used, the conductors 20—20 and 21—21 may be used as a return ground conductor. Since the conductors 20—20 and 21—21 tend to sink slightly into the rubber insulation layer 19, they add very little to the size of the individual conductors and consequently produce little change in the over-all dimensions of the electric cable.

A particularly advantageous feature of the hereinabove described method of shielding insulated conductors is the fact that the amount of shielding may be varied in accordance with requirements for cables for specific purposes by increasing or decreasing the lay and/or the number of the conductors 20—20 and 21—21.

The invention is not limited to the particular embodiment thereof disclosed in the accompanying drawing, but may take many other equivalent forms. It is immaterial for the purposes of this invention whether or not the conductors shielded are multi-stranded tinsel conductors, since conductors comprising but a single wire may be similarly and equally successfully shielded. The shield composed of conductors 20—20 and 21—21 may be applied with equal effect over rubber insulation or textile insulation. The number of layers of insulation separating the shielding conductors and the shielded conductor may be varied to suit the individual case.

A number of conductors having various diameters may be used for shielding purposes with equal effect. For example, 32, 34 and 36 gauge wire have proven to be equally satisfactory when used for shielding purposes.

A single insulated conductor may be constructed instead of a cable as described, there being no difference in construction except that the outer layer of rubber insulation is applied about the individual conductor rather than the group of conductors, as in the formation of a cable. Any or all of the insulated conductors may be shielded without involving any departure from the present invention.

Other changes and modifications in the particular embodiment of the invention described herein and illustrated in the accompanying drawing will be apparent to those skilled in the art.

What is claimed is:

1. An insulated electrical conductor comprising a central tinsel conductor, a layer of braided insulating material over the tinsel conductor, a layer of rubber insulation surrounding the layer of braided insulating material, a plurality of fine wires wound helically and in opposite directions about the rubber insulation of the tinsel conductor, the number and lay of the wires being such as to provide a predetermined degree of shielding of the insulated tinsel conductor.

2. An electric cable comprising a plurality of tinsel conductors, a layer of rubber insulation surrounding each conductor, a plurality of fine wires helically wound parallel to one another in one direction about the rubber insulation of each conductor, a plurality of fine wires helically wound parallel to one another in a direction opposite to said first-mentioned direction, the number and lay of the wires being such as to provide a predetermined degree of shielding of each insulated conductor, and a covering of rubber insulation enclosing all of the insulated conductors.

3. An electric cable comprising a plurality of multi-stranded tinsel conductors which are twisted around one another, a braid of textile material applied over each tinsel conductor, a layer of rubber insulation surrounding the braid of textile material on each tinsel conductor, a pair of fine wire conductors wound parallel to one another in open lay helixes about the rubber insulation of each tinsel conductors, a second pair of fine wire conductors wound parallel to one another in open lay helixes about the rubber insulation of each tinsel conductor that it is desired to shield and in a direction opposite to that in which the first-mentioned pair of helically wound conductors are wound, the lays of the resulting helical windings being such as to provide a predetermined degree of shielding of the insulated conductors to which they are applied, and a covering of rubber insulation surrounding all of the conductors.

JOHN SHIELD.